US012682212B1

(12) United States Patent　　　(10) Patent No.:　US 12,682,212 B1

Gurumurthy et al.　　　　　　　(45) Date of Patent:　　　Jul. 14, 2026

(54) TECHNIQUES FOR CORRECTING PREDICTION ERRORS IN NEURAL NETWORKS

(71) Applicant: NVIDIA Corporation, Santa Clara, CA (US)

(72) Inventors: Prakash Gurumurthy, Sunnyvale, CA (US); Mu-Heng Yang, San Jose, CA (US); Yan Breek, Santa Clara, CA (US); Avinash Vem, Santa Clara, CA (US); Fay Wang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1100 days.

(21) Appl. No.: 16/298,993

(22) Filed: Mar. 11, 2019

(51) Int. Cl.
　　G06N 3/044　　(2023.01)
　　G06N 3/045　　(2023.01)
　　G06N 3/08　　(2023.01)

(52) U.S. Cl.
　　CPC ............. G06N 3/044 (2023.01); G06N 3/045 (2023.01); G06N 3/08 (2013.01)

(58) Field of Classification Search
　　CPC ....... G06N 3/0445; G06N 3/0454; G06N 3/08
　　See application file for complete search history.

(56) References Cited

U.S. PATENT DOCUMENTS

| | | | |
|---|---|---|---|
| 2016/0358070 A1 * | 12/2016 | Brothers .............. | G06N 3/0454 |
| 2019/0272557 A1 * | 9/2019 | Smith ................ | G06Q 30/0224 |
| 2020/0242470 A1 * | 7/2020 | Menkovski .............. | G06N 3/08 |

OTHER PUBLICATIONS

Ranzato, Marc'Aurelio, et al. "Sequence level training with recurrent neural networks." arXiv preprint arXiv:1511.06732 (2015). https://arxiv.org/pdf/1511.06732.pdf (Year: 2015).*

Yin, Tong, et al. "Personalized Behavior Prediction with Encoder-to-Decoder Structure." 2018 IEEE International Conference on Networking, Architecture and Storage (NAS). IEEE, 2018. https://ieeexplore.ieee.org/stamp/stamp.jsp?tp=&arnumber=8515696&tag=1 (Year: 2018).*

Du, Shengdong, Tianrui Li, and Shi-Jinn Horng. "Time series forecasting using sequence-to-sequence deep learning framework." 2018 9th international symposium on parallel architectures, algorithms and programming (PAAP). IEEE, 2018. https://ieeexplore.ieee.org/stamp/stamp.jsp?tp=&arnumber=8701741&tag=1 (Year: 2018).*

Bahdanau, Dzmitry, et al. "An actor-critic algorithm for sequence prediction." arXiv preprint arXiv:1607.07086 (2016). https://arxiv.org/pdf/1607.07086.pdf (Year: 2016).*

Plakandaras, Vasilios, Periklis Gogas, and Theophilos Papadimitriou. "The effects of geopolitical uncertainty in forecasting financial markets: A machine learning approach." Algorithms 12.1 (2018): 1. https://www.mdpi.com/1999-4893/12/1/1 (Year: 2018).*

(Continued)

*Primary Examiner* — Michael H Hoang

(74) *Attorney, Agent, or Firm* — Robert C. Kowert; Kowert, Hood, Munyon, Rankin & Goetzel, P.C.

(57)　　　　　ABSTRACT

One or more arithmetic logic circuits to at least partially cause a neural network to be trained by replacing one or more activations generated by one or more layers of the neural network with ground truth data depending on how accurate the one or more activations are predicted to be. The one or more arithmetic logic circuits may be implemented as part of a processor or computer system.

33 Claims, 10 Drawing Sheets

(56)        References Cited

OTHER PUBLICATIONS

Wang, Bao, et al. "Deep neural nets with interpolating function as output activation." Advances in neural information processing systems 31 (2018). https://proceedings.neurips.cc/paper/2018/file/6ecbdd6ec859d284dc13885a37ce8d81-Paper.pdf (Year: 2018).*

Li, Zimo, et al. "Auto-conditioned recurrent networks for extended complex human motion synthesis." arXiv preprint arXiv:1707.05363 (2017). (Year: 2017).*

Baydogan, Mustafa Gokce, George Runger, and Eugene Tuv. "A bag-of-features framework to classify time series." IEEE transactions on pattern analysis and machine intelligence 35.11 (2013): 2796-2802. https://ieeexplore.ieee.org/abstract/document/6497440 (Year: 2013).*

Bengio, Samy, et al. "Scheduled sampling for sequence prediction with recurrent neural networks." Advances in neural information processing systems 28 (2015). https://proceedings.neurips.cc/paper/2015/hash/e995f98d56967d946471af29d7bf99f1-Abstract.html (Year: 2015).*

Tsung, Fu-Sheng. "Learning in recurrent finite difference networks." Connectionist Models. Morgan Kaufmann, 1991. 124-130. https://www.sciencedirect.com/science/article/pii/B9781483214481500184 (Year: 1991).*

Zhong, Kai, et al. "Recovery guarantees for one-hidden-layer neural networks." International conference on machine learning. PMLR, 2017. https://proceedings.mlr.press/v70/zhong17a/zhong17a.pdf (Year: 2017).*

Ramachandran, Prajit, Barret Zoph, and Quoc V. Le. "Searching for activation functions." arXiv preprint arXiv:1710.05941 (2017). https://arxiv.org/pdf/1710.05941 (Year: 2017).*

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

* cited by examiner

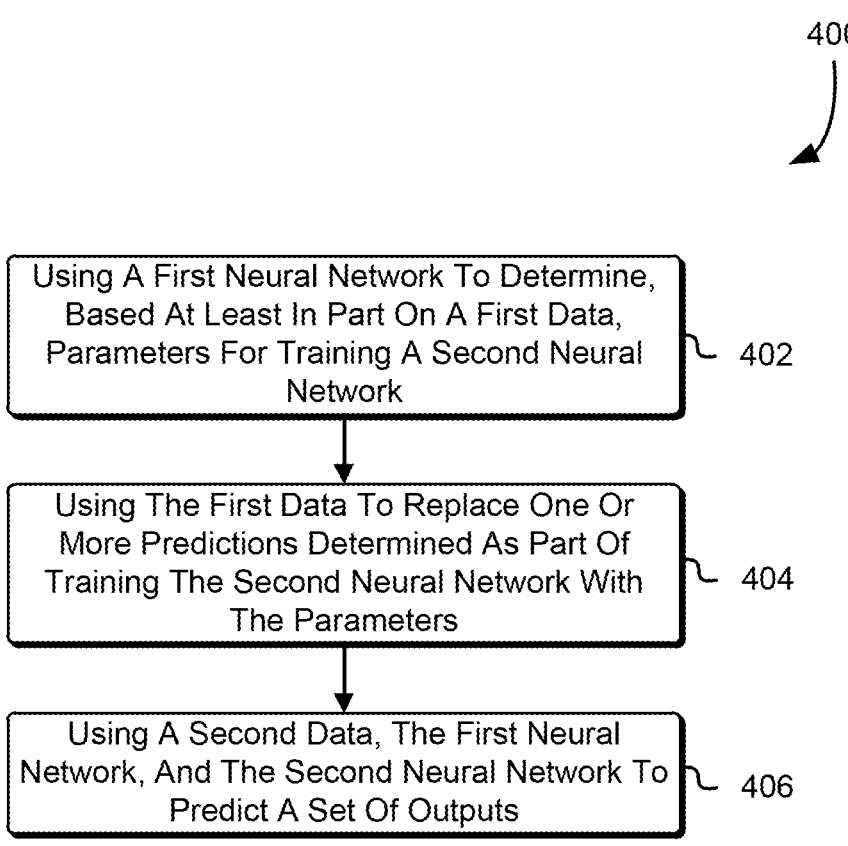

400

Using A First Neural Network To Determine, Based At Least In Part On A First Data, Parameters For Training A Second Neural Network — 402

Using The First Data To Replace One Or More Predictions Determined As Part Of Training The Second Neural Network With The Parameters — 404

Using A Second Data, The First Neural Network, And The Second Neural Network To Predict A Set Of Outputs — 406

FIG. 4

TECHNIQUES FOR CORRECTING PREDICTION ERRORS IN NEURAL NETWORKS

BACKGROUND

Sequence-to-sequence (seq2seq) can refer to an encoder-decoder model for generation of sequences of data in which a variable-length input sequence is provided to the encoder which is encoded, by the encoder, into an encoded vector and the encoded vector is provided to the decoder as an input to the decoder, which generates a variable-length output. There are many challenges in seq2seq training surrounding erroneous predictions. In the hidden or intermediate layers of a decoder, there an erroneous output may be generated, which is used as the input to a subsequent hidden or intermediate layer. Accordingly, these erroneous outputs become erroneous inputs for the subsequent or intermediate layers, and can cause the propagation of prediction errors across output sequences. Accordingly, in short output sequences, these propagation errors can cause poor performance of prediction models in various contexts.

BRIEF DESCRIPTION OF THE DRAWINGS

Various techniques will be described with reference to the drawings, in which:

FIG. 4 shows an illustrative example of a process for step-by-step correction of prediction errors, in accordance with an embodiment;

DETAILED DESCRIPTION

Figure 1:
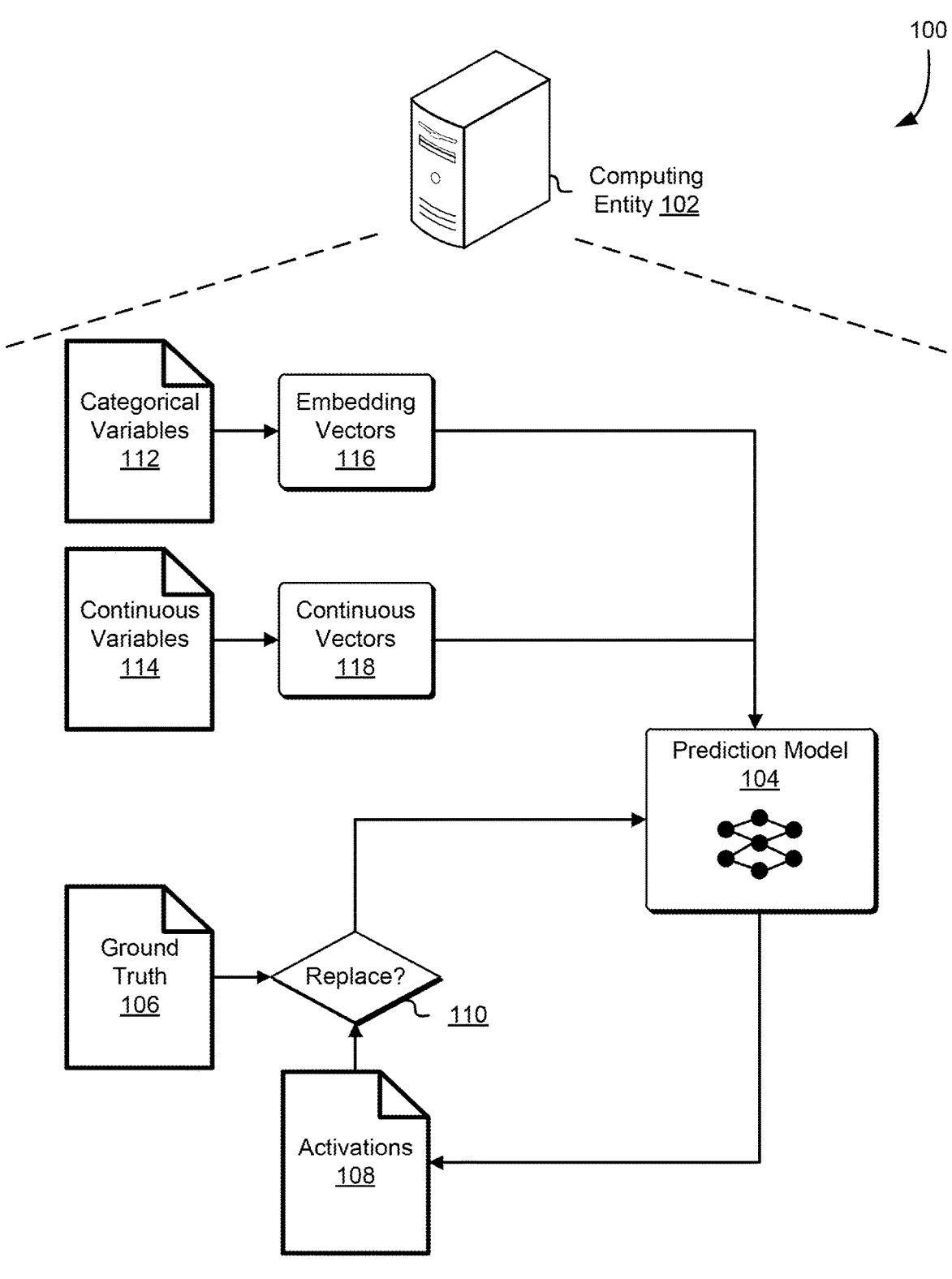
FIG. 1 illustrates a diagram of a system in which an embodiment in accordance with this disclosure is implemented.

Sequence-to-sequence learning refers to an encoder-decoder model for sequence generation, in an embodiment. In an embodiment, a sequence-to-sequence model uses a variable-length input sequence and encoder to generate a fixed-length encoder state, and then uses the encoder state and decoder to generate a variable-length output sequence. In an embodiment, techniques described herein relate to correcting prediction errors in sequence-to-sequence learning by probabilistically replacing a predicted value determined by the neural network with a correct value as part of a training process of a machine-learning algorithm. In an embodiment, correcting prediction errors improves the efficiency of a computer system by reducing the amount of computational resources that are needed to generate a machine-learning model, reducing the amount of time that it takes to generate a machine-learning model, increasing the quality of a machine-learning model that can be generated using a finite set of computing resources, and any combination thereof. Techniques described herein are, in an embodiment, practical applications that can be applied in various contexts, such as in unmanned vehicles, autonomous vehicles, and other contexts such as in the context of making more accurate predictions to improve real-world results for data-driven decision making. In an embodiment, internal and external data feeds for training the sequence-to-sequence model are integrated to implement a data pipeline that that combines various sources as features to a deep learning model. In an embodiment, time series data collected over a historical time interval are used to generate a predicted time series for the future.

In an embodiment, a feedforward network (FCN) utilizes an innovative approach to encode categorical data by using embedding layers to learn clusters and combine with continuous features to determine mathematical relationships between various factors that affect generated activations or predictions. In an embodiment, the mathematical relationship between various inputs is modeled as a non-linear relationship. In an embodiment, embedding techniques described herein are utilized to experiment with and learn arbitrary n-level interaction effects for a set of two or more categorical variables. In an embodiment, learning categorical interaction effects is an improvement to a computer system by providing the ability to interpret and learn from categorical interaction effects more efficiently than traditional methods.

In an embodiment, prediction error correction is performed using a long short term memory (LSTM) network to data prediction and forecasting problems by representing demand as a sequence or time series. Techniques described herein include non-conventional techniques that adapt LSTM networks and reshaping data to learn the sequence-to-sequence relationship between different input parameters and output sequence which can be scoped based on prediction parameters. In an embodiment, implementing deep learning approaches described in this disclosure improve the operation of computer systems by improving the accuracy of models. In an embodiment, applying prediction error correction techniques described herein deliver a high level of forecasting accuracy (over 90%) when backtested against different historical time series.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram of a system 100 in which an embodiment in accordance with this disclosure is implemented. In an embodiment, a computing entity 102 such as a computer system or computer server generates the predictive model. In an embodiment, the computing entity 102 is or includes a computer system or processing unit such as those describe in connection with FIGS. 6-10. In an embodiment, the computing entity 102 is a distributed system comprising multiple computer servers that collectively operate as a computing entity that generates the predictive model. In an embodiment, the computing entity 102 is a server computer system, a server cluster, a virtual computer system, a virtual server, a virtual runtime environment, a container environment, a serverless execution environment, or service hosting system. In an embodiment, the computing entity 102 is or includes an application-specific integrated circuit (ASIC) microchip that is designed for a specific use or application. In an embodiment, the computing entity includes specialized circuitry for sparse activation; low-precision computations; low-latency operations (e.g., in a real-time operating system (RTOS) computing environment); low-power hardware; and combinations thereof. In an embodiment, the computing entity 102 has associated memory in a memory hierarchy such that there are regions of faster memory (e.g., registers and L1 cache) as well as regions of slower memory (e.g., main memory). In an embodiment, the computing entity 102 executes computer-readable instructions to perform a process in accordance with those described in connection with FIGS. 4 and 5.

In an embodiment, the prediction model 104 is an encoder-decoder model comprising an encoder and a decoder in which the encoder generates, from an input, encoded state information or parameters and the decoder generates, from the encoded state information or parameters, an output. In an embodiment, the input and/or the output can be of variable size while the encoded state information or parameters is encoded a fixed-length variable whose size is not dependent on the size of the input. In an embodiment, the encoder and/or the decoder is an artificial neural network such as a recurrent neural network.

In an embodiment, sequence-to-sequence—also referred to as seq2seq—refers to an encoder-decoder model for generation of sequences of data. In an embodiment, a variable-length input sequence is provided to the encoder which is encoded, by the encoder, into an encoded vector; the encoded vector is provided to the decoder as an input to the decoder, which generates a variable-length output. In an embodiment, the variable-length output is a prediction. In an embodiment, the encoder and decoder respectively comprises a plurality of neural network units such as GRU or LSTM units. In an embodiment, the decoder comprises a sequence of neural network units. In an embodiment, the encoded vector is fed as an input into a first unit of the decoder, wherein the cardinality of the units refers to the order in which the units are activated. In an embodiment, historical data is used to train neural network units of an encoder to generate encoder states and neural network units of a decoder to generate a prediction based on the encoder state. In an embodiment, training of a machine-learning or deep learning model includes adjusting and determining weights for individual neural networking units to reduce prediction error.

During training, in an embodiment, ground truth data 106 historical data is used to train the encoder to generate an encoder state comprising a set of values which are adjusted to reduce expected prediction error. In an embodiment, the encoder state generated as an output of the encoder is provided as an input to a decoder. In an embodiment, the decoder comprises a plurality of units that are sequentially connected, wherein the first unit of the sequence receives the encoder state as an input and the last unit of the sequence provides, as the output, a predicted outcome which may be in the form of a value, string, number, time series, etc. In an embodiment, the units are neural network units such as GRUs or LSTMs. In an embodiment, historical time data, which may be in the form of a time series of data points, is submitted to the encoder as a set of inputs $X_1, X_2, X_3 \ldots$ to respective encoder neural network units in sequence to generate an encoder state. In an embodiment, the encoder state is provided to a first unit of the decoder as an input to generate a first hidden state (which may also be referred to as an intermediate prediction) $\overline{Y}_1$. The first hidden state $\overline{Y}1$, in an embodiment, is provided as an input to a second unit of the decoder to generate a second intermediate prediction $\overline{Y}_2$ and so on. The activations 108 of the neural networks, in an embodiment, are values of a predicted time series, such as in the case where the inputs $X_1 \ldots X_n$ correspond to data points measured at times $t_1 \ldots t_n$ and the activations $\overline{Y}_1 \ldots \overline{Y}_m$ refer to predicted values of the same time series at times $t_{n+1} \ldots t_{n+m}$. In an embodiment, the time series for data points measured at times $t_1 \ldots t_{n+m}$ is known a priori, wherein the data points over $t_1 \ldots t_n$ to are used as training data and the data points over $t_{n+1} \ldots t_{n+m}$ are used as evaluation data (i.e., the two time series are contiguous) to determine prediction errors between the true measured values $Y_1 \ldots Y_m$ and predicted values $\overline{Y}_1 \ldots \overline{Y}_m$ which can be measured as: $Y_i - \overline{Y}_i$ where $1 \le i \le m$. In an embodiment, during training of the decoder, instead of using a prediction $\overline{Y}_i$ as an input to the i+1-th neural network unit, the system probabilistically selects either $\overline{Y}_i$ or $Y_i$ (which is known as the ground truth) t be used as the input to the i+1-th neural network to generate a next prediction $$\overline{Y_{i+1}}.$$

Accordingly, in an embodiment, a seq2seq model learns faster with the guidance of ground truth at least, in some cases, because using the prediction $Y_i$ instead of $\overline{Y}_i$ eliminates the propagation of prediction errors. In an embodiment, the decoder output or final prediction $\overline{Y_m}$ is never probabilistically replaced.

In an embodiment, the computing entity 102 includes logic 110 to determine whether to replace an intermediate prediction $\overline{Y}_i$ using ground truth $Y_i$. In an embodiment, the system probabilistically determines whether to replace the intermediate prediction $\overline{Y}_i$ using ground truth $Y_i$. In an embodiment, the system determines a manner in which to use ground truth $Y_i$ as a part of generating a replacement value, such as through linear interpolation techniques as described in connection with FIGS. 2 and 4. In an embodiment, the logic 110 is part of a computer program or software that calculates a probabilistic replacement value based on a function P that adjusts the probability of performing a replacement based on one or more of the following factors: epochs of training; prediction error; length; and variance in output sequence. The function P can be generated in accordance with techniques discussed elsewhere in this disclosure, such as in connection with FIGS. 2 and 4.

In an embodiment, the training data for a machine learning task comprises various types of data such as categorical variables 112—which can be further classified as being either nominal or ordinal—as well as continuous variables 114. In an embodiment, ordinal categorical variables have an ordering (e.g., "High," "Medium," and "Low") whereas nominal categorical variables have no ordering (e.g., "Spain," "United States," and "Australia") and continuous variables can be represented as integers, floating point numbers, etc. In an embodiment, embedding vectors 116 or embedding layers are used to represent categorical variables and their interaction effects by utilizing an approach that experiments with and learns n-level interaction effects specified by the user for a set of categorical variables. In an embodiment, learning categorical interaction effects using the approaches described herein can be utilized to more effectively interpret categorical interaction effects than traditional methods, thereby improving the operation of a computer system. In an embodiment, a given data set with X (features) and Y (target) refers to features such as categorical variables, categorical interaction effects, and continuous variables and targets which are regression or classification targets. In an embodiment, categorical interaction effects are included to account for the relationship between multiple categorical variables which are predictive of the outcome variable. In an embodiment, a 4-level interaction effect is useful in a learning task wherein the outcome being predicted is influenced by seasonal factors such as the days of the year (365 categories each representing a day of the calendar), location (e.g., 100+ categories that each represent a country), holiday or event on a specific day of the year (e.g., 1000+ categories each representing a holiday), and the days of the week (e.g., 7 categories, each representing a day of the week). In an embodiment, and continuing with the previous description, there are four categorical variables, namely $X1_{CT}$ (i categories), $X2_{CT}$ (j categories), $X3_{CT}$ (k categories), and $X4_{CT}$ (l categories) and the interaction effect between these categories is to be learned by the network in addition to independently learning all of the single level effects. In an embodiment, a new variable called $X_{CTINT}$ is created and added to the data, wherein $X_{CTINT}$ is a concatenation or any other suitable combination of the aforementioned category variables. In an embodiment, $X_{CTINT}$=Concatenate($X1_{CT}$ . . . $X4_{CT}$) which would result in the total number of categories for the new variable to be i*j*k*l, based on the domain space of each of the categorical variables. In an embodiment, this new variable is treated as another single level categorical variable and learned using embedding layers, the underlying relationship between the n-categorical variables to predict the outcome. In an embodiment, the concatenated variable $X_{CTINT}$ is combined with other continuous and categorical variables to learn more complex data relationships. In an embodiment, these techniques allow for experimentation with arbitrary n-level interaction effects that can be specified by a user for modeling a specific problem. In an embodiment, the user can experiment with an interaction effect by adding them to the network using the embedding approach and evaluate if the error (e.g., cross-entropy or root mean square error (RSME)) improved due to the introduction of the new variable.

Training data, in an embodiment, includes continuous variables, categorical variables, and combinations thereof. In an embodiment, embedding vectors 116 are used to represent categorical variables and their interaction effects. In an embodiment, interaction effects relate to the relationship between two or more categorical variables, such as whether a holiday (a first category) falls on a weekend (day-of-week, a second category). In an embodiment, a categorical variable is represented as $X1_{CT}$, $X2_{CT}$, etc. and embedding vectors are represented as a concatenation of one or more categorical variables such as $E_{CT,1}$=($X1_{CT}$,$X4_{CT}$, $X7_{CT}$), $E_{CT,2}$=($X2_{CT}$) wherein each embedding vector is a concatenation of the underlying categorical features. Likewise, continuous variables, in an embodiment, are represented as $X1_{CO}$, $X2_{CO}$, etc. A continuous vector 118 is represented, in an embodiment, as a scaled (e.g., normalized) vector that concatenates the values of a set of continuous variables. The embedding vectors 116 and continuous vectors 118, in an embodiment, are concatenated to form an input layer to a prediction model 104 such as a deep learning model with one or more hidden layers to generate a target. In an embodiment, the target is a target variable averaged from a number of random seeds. In an embodiment, 20 random seeds are averaged to generate the target variable. In an embodiment, the target is a predicted demand for a specific product (e.g., GPU) or set of products which can be scoped to a specific date or range of dates, a specific location or set of locations, and so on.

Figure 2:
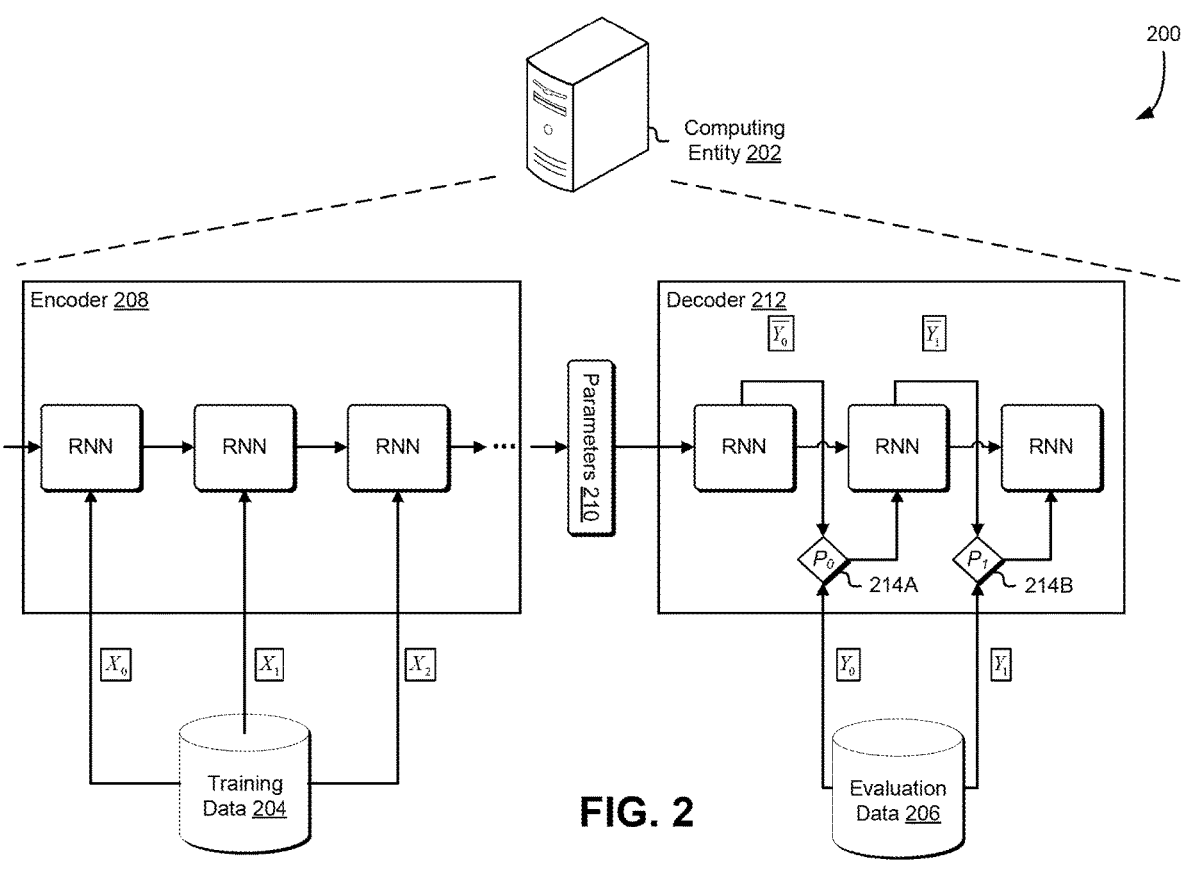
FIG. 2 illustrates a diagram of a system for step-by-step correction of prediction errors, in accordance with an embodiment.

FIG. 2 illustrates a diagram of a system 200 in which one or more arithmetic logic circuits at least partially cause a neural network to be trained by replacing one or more activations generated by one or more layers of the neural network with ground truth data depending on how accurate the one or more activations are predicted to be, in accordance with an embodiment. In an embodiment, a computing entity 202 such as a computer system or computer server generates the predictive model. In an embodiment, the computing entity 202 is or includes a computer system or processing unit such as those describe in connection with FIGS. 6-10. In an embodiment, the computer system 202 is a distributed system comprising multiple computer servers that collectively operate as a computing entity that generates the predictive model. In an embodiment, the computer system 202 is a server computer system, a server cluster, a virtual computer system, a virtual server, a virtual runtime environment, a container environment, a serverless execution environment, or service hosting system. In an embodiment, the computing entity 202 is or includes an application-specific integrated circuit (ASIC) microchip that is designed for a specific use or application. In an embodiment, the computing entity includes specialized circuitry for sparse activation; low-precision computations; low-latency operations (e.g., in a real-time operating system (RTOS) computing environment); low-power hardware; and combinations thereof. In an embodiment, the computing entity 202 has associated memory in a memory hierarchy such that there are regions of faster memory (e.g., registers and L1 cache) as well as regions of slower memory (e.g., main memory).

In an embodiment, training data 204 is a portion of historical data collected over time that is used as part of training a machine-learning model such as a neural network. In an embodiment, the historical data is divided into two non-overlapping data sets—training data 204 and evaluation data 206. In an embodiment, the evaluation data 206 is withheld during training—except through the prediction error correction units such as the units 214A and 214B illustrated in FIG. 2. In an embodiment, the training data 204 is stored in any suitable data storage medium such as a hard disk drive, network-attached storage (NAS), database system or server, data storage service, and more. In an embodiment, weights and parameters for generating hidden state of an encoder 208 of an encoder-decoder model are trained using the training data 204. In an embodiment, the training data comprises a time series of data points, such as the historical demand of a GPU over time, as well as additional information regarding that historical data, such as cost information, holidays, exchange rates, and other factors that may be considered as part of forecasting future demand. In an embodiment, the encoder 208 is implemented as a series of recurrent neural network (RNN) units such as long short-term memory (LSTM) units that are configured to generate parameters 210 that represent a fixed-length encoded state based on the input time series. The parameters 210, in an embodiment, are supplied as an input to a decoder 212 of the same encoder-decoder model to determine a predicted output. In an embodiment, the decoder 212 is implemented using a plurality of RNNs such as LSTM units. In an embodiment, a first RNN unit of the decoder 212 receives the parameters 210 and generates a first activation $\overline{Y}_0$, which is a hidden state of the decoder 212.

During training and in an embodiment, the first activation $\overline{Y}_0$ is compared against the ground truth $Y_0$ which is obtained from the evaluation data 206 portion of the historical data and a determination is made whether to replace the first activation $\overline{Y}_0$ with the first correct value $Y_0$. In an embodiment, the computing entity determines a probability to replace the first activation $\overline{Y}_0$ with the correct value $Y_0$ which is based on one or more of the following considerations: magnitude of the prediction error; number of epochs trained; number of epochs remaining to train; length of sequence; and variance of sequence. In an embodiment, techniques described elsewhere, such as those discussed in connection with FIG. 4 are utilized to determine the probability to perform a replacement. In an embodiment, once the first probability $P_0$ 214A to replace the first activation $\overline{Y}_0$ with the correct value $Y_0$ is determined, a random or pseudo-random number is generated to determine whether to perform the replacement. In an embodiment, if the replacement is determined to be performed, the system provides the ground truth instead of the first activation as an input to the next RNN unit to generate a second activation $Y_1$ which, likewise, is subjected to a stochastic process to determine a second probability $P_1$ 214B whether to replace the second activation $\overline{Y}_1$ with the second correct value $Y_1$. In an embodiment, this process is repeated until the decoder 212 generates a final activation $Y_M$, which is compared against the expected value from the evaluation data 206 to determine how well the model performs.

Figure 3:
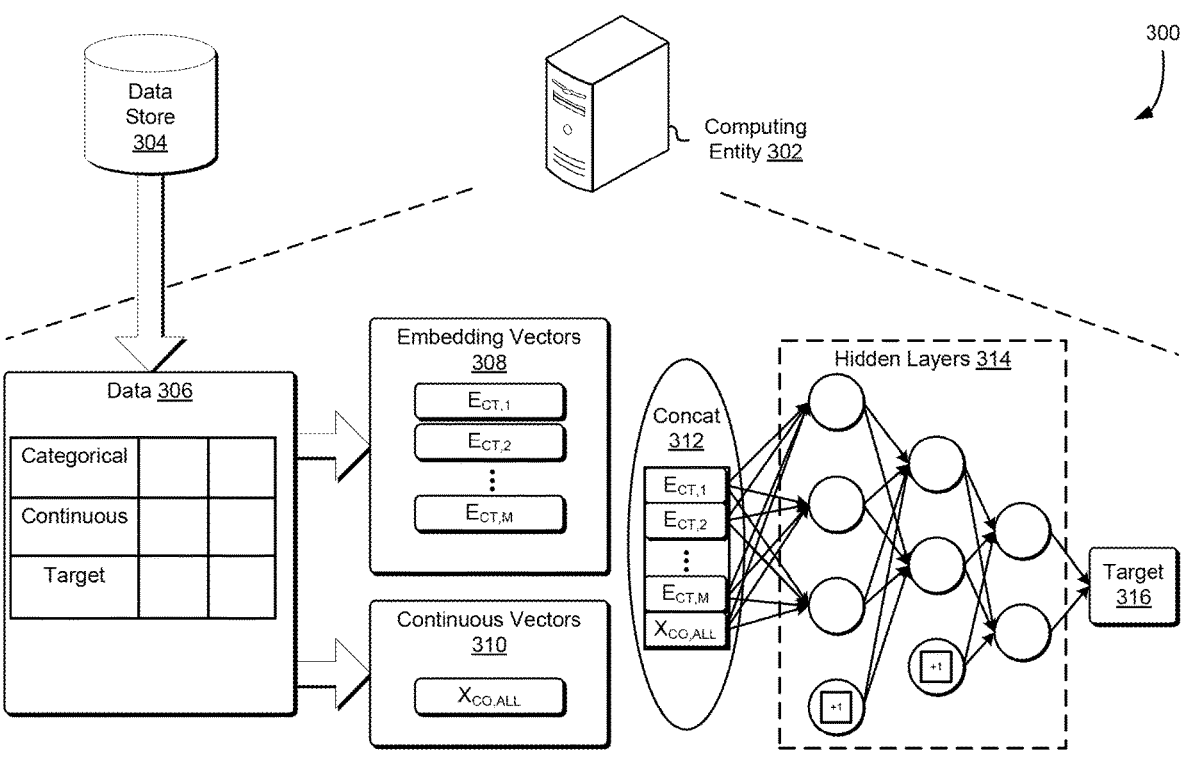
FIG. 3 illustrates a diagram of a system in embedding layers in a machine-learning network are used to represent categorical data, in accordance with one embodiment.

FIG. 3 illustrates a diagram of a system 300 in embedding layers in a machine-learning network are used to represent categorical data, in accordance with one embodiment. In an embodiment, the computing entity 302 is any suitable computing entity such as those described in connection with FIG. 1. In an embodiment, the computing entity 302 is connected or otherwise has access to a data store 304 that stores, in a persistent storage medium, a data set comprising data entries. In an embodiment, the data store 304 includes a database system that organizes and stores data 306 in columns and rows, wherein a column represents a data type and a row represents a data entry. The data store, in an embodiment, is any suitable data storage entity such as a hard disk drive, network-attached storage (NAS), database system or server, data storage service and more. In an embodiment, the data includes a data set comprising a plurality of data entries. The data entries, in an embodiment, include features that are individual measurable properties or characteristics such as data points collected over time. In an embodiment, data points that are collected include data associated with a GPU such as performance, power, product age, and price, data associated with marketing impact, such as world wide web search analytics and social media relevant (e.g., mentions on a social network), data points associated with events, such as whether a particular point in time coincided with a holiday (which may be region-specific), retail sale events, back-to-school, and data points associated with econometrics such as cryptocurrency price/demand/events, consumer confidence (e.g., as measured by consumer spending or consumer confidence index), and currency exchange rates. In an embodiment, the computing entity 302 is or includes an application-specific integrated circuit (ASIC) microchip that is designed for a specific use or application. In an embodiment, the computing entity includes specialized circuitry for sparse activation; low-precision computations; low-latency operations (e.g., in a real-time operating system (RTOS) computing environment); low-power hardware; and combinations thereof. In an embodiment, the computing entity 302 has associated memory in a memory hierarchy such that there are regions of faster memory (e.g., registers and L1 cache) as well as regions of slower memory (e.g., main memory).

The data 306 is used, in an embodiment, includes continuous variables, categorical variables, and combinations thereof. In an embodiment, embedding vectors are used to represent categorical variables and their interaction effects. In an embodiment, interaction effects relate to the relationship between two or more categorical variables, such as whether a holiday (a first category) falls on a weekend (day-of-week, a second category). In an embodiment, a categorical variable is represented as $X1_{CT}$, $X2_{CT}$, etc. and embedding vectors 308 are represented as a concatenation of one or more categorical variables such as $E_{CT,1}=(X1_{CT}, X4_{CT}, X^7{}_{CT})$, $E_{CT,2}=(X2_{CT})$ wherein each embedding vector is a concatenation of the underlying categorical features. Likewise, continuous variables, in an embodiment, are represented as $X1_{CO}$, $X2_{CO}$, etc. A continuous vector 310 is represented, in an embodiment, as a scaled (e.g., normalized) vector that concatenates the values of a set of continuous variables. The embedding vectors 308 and continuous vectors 310, in an embodiment, are concatenated to form an input layer 312 to a deep learning model with one or more hidden layers 314 to generate a target 316. In an embodiment, the target 316 is a target variable averaged from a number of random seeds. In an embodiment, 20 random seeds are averaged to generate the target variable. In an embodiment, the target is a predicted demand for a specific product (e.g., GPU) or set of products which can be scoped to a specific date or range of dates, a specific location or set of locations, and so on.

FIG. 4 shows an illustrative example of a process 400 for correcting prediction errors in accordance with an embodiment. Some or all of the process 400 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof, in an embodiment. In an embodiment, the code is stored on a computer-readable storage medium in the form of a computer program comprising a plurality of computer-readable instructions executable by one or more processors. In an embodiment, the computer-readable storage medium is a non-transitory computer-readable medium. In an embodiment, at least some of the computer-readable instructions usable to perform the process 400 are not stored solely using transitory signals (e.g., a propagating transient electric or electromagnetic transmission). In an embodiment, a non-transitory computer-readable medium includes non-transitory data storage circuitry (e.g., buffers, caches, and queues) within transceivers of transitory signals. In an embodiment, the process 400 is performed in accordance with other embodiments of this disclosure such as FIGS. 1 and 2. In an embodiment, the system performing the process 400 is or includes an application-specific integrated circuit (ASIC) microchip that is designed for a specific use or application. In an embodiment, the computing entity includes specialized circuitry for sparse activation; low-precision computations; low-latency operations (e.g., in a real-time operating system (RTOS) computing environment); low-power hardware; and combinations thereof. In an embodiment, the system performing the process 400 has associated memory in a memory hierarchy such that there are regions of faster memory (e.g., registers and L1 cache) as well as regions of slower memory (e.g., main memory). In an embodiment, the system performing the process 400 is a processor including but not limited to: a parallel processing unit ("PPU"), in accordance with those described in connection with FIG. 6; a general processing cluster ("GPC"), in accordance with those described in connection with FIG. 7; a streaming multi-processor, in accordance with those described in connection with FIG. 9; and a central processing unit ("CPU") or graphics processing unit ("GPU") of a system described in accordance with FIG. 10.

In an embodiment, a computer system performs at least a portion of the process by using 402 a first neural network to determine, based at least in part on a first data, parameters for training a second neural network. In an embodiment, behavioral planning logics are utilized in place of the neural networks. In an embodiment, the first behavioral planning logic and the second behavioral planning logic are part of an encoder-decoder model. In an embodiment, the first behavioral planning logic comprises one or more recurrent neural networks (RNNs) and/or other types of artificial neural networks (ANNs). In an embodiment, the first behavioral planning logic is an encoder of an encoder-decoder model. In an embodiment, the first data is training data for a time series of data points representing a demand curve collected over time. In an embodiment, the parameters include encoded state generated from the encoder by providing historical data as an input to the encoder. In an embodiment, the encoder is configured to accept a variable-length input and generates the parameters as a fixed-length output.

In an embodiment, behavioral planning logic includes any suitable computational logic which can be based on Boolean circuitry, quantum circuitry, and more. In an embodiment, a behavior planning logic includes an artificial neural network. In an embodiment, the neural network is a recurrent neural network comprising connections between nodes to form a directed graph along a temporal sequence. In an embodiment, the RNN is represented and/or implemented as a directed acyclic graph that can be unrolled and replaced with a strictly feedforward neural network. In an embodiment, a recurrent neural network is implemented using a network of long short-term memory (LSTM) units that include feedback connections. In an embodiment, the neural network is implemented using one or more gated recurrent units (GRUs).

The system, in an embodiment, performs at least a portion of the process by using 404 the first data to replace one or more activations determined as part of training the second neural network with the parameters. In an embodiment, using the first data to replace one or more activations determined as part of training the second behavioral planning logic (e.g., second neural network) comprises, during training, replacing an activation $\overline{Y}_t$ with the ground truth $Y_i$ to predict $\overline{Y}_{t+1}$ so that prediction error no longer propagates. In an embodiment, during training, the seq2seq learns faster and better with guidance from the ground truth. In an embodiment, a function P( ) is calculated to determine a probability between 0 and 1 that can be custom-designed to determine the probability to replace $\overline{Y}_t$ with $Y_i$. In an embodiment, the probability P( ) for probabilistically replacing a predicted value with ground truth is determined based at least in part on various factors, which can be weighted factors. In an embodiment, the various factors include the epoch of the training, such that as the number of epochs of training grows, the replacement probability is decreased or attenuated. In an embodiment, the prediction error is used to adjust the replacement probability such that if the magnitude of the prediction error is large, the replacement probability is adjusted upwards. In an embodiment, the length of the output sequence may be directly or proportionally correlated with the replacement probability such that if output sequences are long, the replacement probability is set larger to mitigate error propagation in longer sequences. In an embodiment, the replacement probability is adjusted upwards when the output sequence is noisy with high variance or high difficulty to predict, so that seq2seq can still learn something step-by-step. In an embodiment, various combinations of the factors described above are utilized to determine whether to probabilistically replace a generated activation $\overline{Y}_t$ with ground truth $Y_i$.

In an embodiment, the system replaces an activation $\overline{Y}_t$ with a linear interpolation value generated based on the ground truth $Y_i$. In an embodiment, a linear interpolation value is generated based on a f value using the following F( ) function: $F=f*Y_i+(1-f)*\overline{Y}_t$ wherein the f value, likewise, is determined based on another function F which is based on various factors such as the epoch, magnitude of prediction error, sequence length, sequence variance, and combinations thereof. In an embodiment, linear interpolation is combined with probabilistic replacement techniques described above. In an embodiment, a generalized form for both P( ) and F( ) is formulated as follows:

$$\overline{Y}_t = \left( \begin{array}{c} Y_n \text{ with probability } p \\ f*Y_i + (1-f)*\overline{Y}_t \text{ with probability } q \\ \overline{Y}_t \text{ with probability } 1-p-q \end{array} \right)$$

In an embodiment, weighting factors such as the f-value for linear interpolation are selected by a user or determined by using machine-learning models with learnable parameters. In an embodiment, weights associated with factors used in the replacement probability calculation function P( ) are learned (e.g., using machine-learning models) or specified by a user. In an embodiment, the replacement probability function is applied in mini-batches where p values conceptually represent eh difficulty of a sequence, so instead of random selection, mini-batches are selected based on the p values of all (or a portion of) samples in the training set. In an embodiment, the probability is determined as follows: Prob(select i)

$$Prob(\text{select } i) = \frac{1-p_i}{\sum 1-p_i}.$$

In an embodiment, the system performs at least a portion of the process by using 406 a second data, the first neural network, and the second neural network to predict a set of outputs. In an embodiment, the second data includes a time series of historical data collected over time which was not necessarily utilized as part of training data and/or evaluation data for training the model. In an embodiment, the system obtains the most recent time series data collected and provides it as an input for the encoder which generates encoded state and the encoded state is supplied as an input to the decoder, which generates a predicted time series as the output. In an embodiment, the ground truth for the hidden states generated by the decoder at this stage is not known a priori and, accordingly, probabilistic replacement does not occur in the decode during the prediction stage in contrast the probabilistic replacements that can occur during the training of the decoder.

Figure 5:
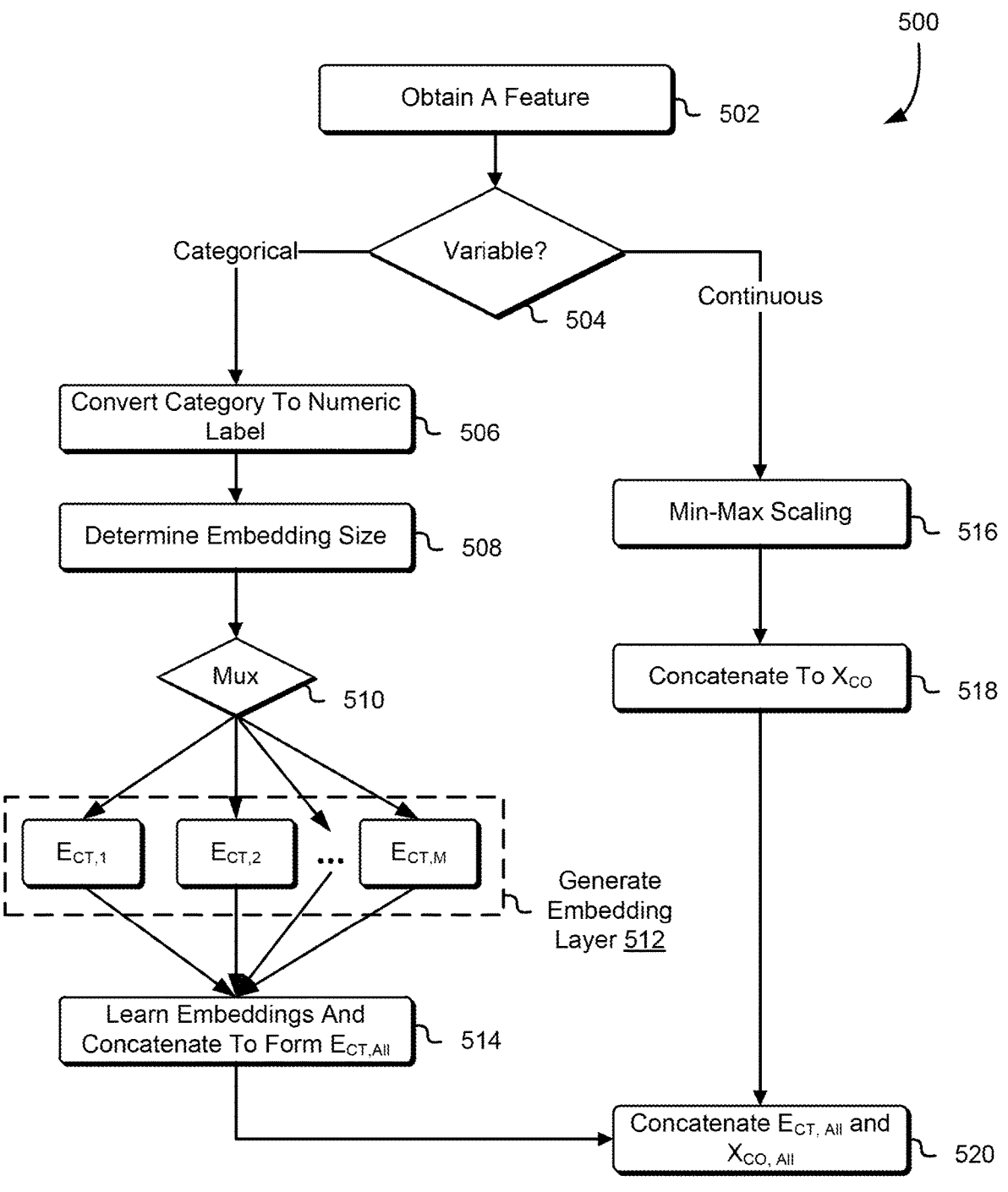
FIG. 5 shows an illustrative example of a process for machine-learning of multi-level interaction effect of a plurality of categorical variables, in accordance with an embodiment.

FIG. 5 shows an illustrative example of a process 500 for machine-learning of multi-level interaction effect of a plurality of categorical variables, in accordance with an embodiment. Some or all of the process 500 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof, in an embodiment. In an embodiment, the code is stored on a computer-readable storage medium in the form of a computer program comprising a plurality of computer-readable instructions executable by one or more processors. In an embodiment, the computer-readable storage medium is a non-transitory computer-readable medium. In an embodiment, at least some of the computer-readable instructions usable to perform the process 500 are not stored solely using transitory signals (e.g., a propagating transient electric or electromagnetic transmission). In an embodiment, a non-transitory computer-readable medium includes non-transitory data storage circuitry (e.g., buffers, caches, and queues) within transceivers of transitory signals. In an embodiment, the process 500 is performed in accordance with other embodiments of this disclosure such as FIGS. 1 and 3. In an embodiment, the system performing the process 500 is or includes an application-specific integrated circuit (ASIC) microchip that is designed for a specific use or application. In an embodiment, the computing entity includes specialized circuitry for sparse activation; low-precision computations; low-latency operations (e.g., in a real-time operating system (RTOS) computing environment); low-power hardware; and combinations thereof. In an embodiment, the system performing the process 500 has associated memory in a memory hierarchy such that there are regions of faster memory (e.g., registers and L1 cache) as well as regions of slower memory (e.g., main memory). In an embodiment, the system performing the process 500 is a processor including but not limited to: a parallel processing unit ("PPU"), in accordance with those described in connection with FIG. 6; a general processing cluster ("GPC"), in accordance with those described in connection with FIG. 7; a streaming multi-processor, in accordance with those described in connection with FIG. 9; and a central processing unit ("CPU") or graphics processing unit ("GPU") of a system described in accordance with FIG. 10.

The system, in an embodiment, obtains 502 a feature. A feature, in an embodiment, refers to an individual measurable property or characteristic. In an embodiment, a feature of a data set is either categorical or continuous. In an embodiment, the feature is obtained from a data entry of training data stored in a persistent storage medium that comprises categorical variables, categorical interaction effects, and continuous variables. In an embodiment, the data entry is associated with a product or service and includes categorical variables such as holidays and events, geographical locations, product or service information, family information, segment information, platform information, day of the week, day of the month, and month of the year and continuous variables such as product or service price, product or service performance metrics, days since available, days since announce, internet speed, online search, and social impact product or service life cycle econometric. Data entries, in an embodiment, are collected based on product or service sales and used for demand forecasting of the product or service in the future, for backtesting forecasting models, and more.

In an embodiment, the system loops through a set of features and, for each feature, determines whether 504 the feature is a categorical variable or continuous variable. In an embodiment, data entries are organized into columns which are associated with a specific type of data which can be mapped to either categorical or continuous data. In an embodiment, the system determines that a categorical variable was obtained and then converts 506 the category to a numeric label. In an embodiment, the system performs label encoding to convert categories to numeric integer labels by encoding the categories as ordinal integer values, which can be illustrated by mapping categories {"cat", "dog", "bird" } to ordinal integer values {1, 2, 3}. In an embodiment, ordinal category variables are mapped to integer values based on the domain space of the ordinal category.

In an embodiment, the system performs at least part of the process by determining 508 an embedding vector size. In an embodiment, the embedding vector size is determined to optimize the predictive value of the category value in the network. In an embodiment, the embedding vector size is determined by calculating a fractional power of the number of categories and rounding the result to the nearest whole number or using a floor or ceiling function as appropriate. In an embodiment, the fractional power is within the range of 2 to 1, inclusive of endpoints. In an embodiment, this embedding vector sizes are calculating according to the following table which takes the cubic root of the number of categories to determine the embedding size, rounded to the nearest whole number:

| Variable | # of Categories (z) | Embedding Size (z^(1/3)) |
|---|---|---|
| X1 | 10 | 2 |
| X2 | 100 | 5 |
| X3 | 1,000 | 10 |
| X1*X3 | 10,000 | 22 |

In an embodiment, the system performs the process by multiplexing 510 to assign embedding layers to all categorical variables, including categorical interactions. In an embodiment, the system creates and assigns embedding layers 512 for every categorical variable. In an embodiment, the embedding layer $E_{CT,i}$ refers to the embedding layer for the i-th categorical variable. In an embodiment, the embedding layer is created and assigned with the following parameters: $E_{CT}$=(Input Dimensions=No. of categories, Output dimension (or embedding vector size)=Round ($z^{(1/3)}$), Input Length=1). In an embodiment, the system learns M embeddings and concatenates and combines the embedding layers to form $E_{CT,All}$ 514 to produce an output that is a vector of 2 dimensions that has embeddings for each category. In an embodiment, this output is combined with the next categorical value and so on until all variables are concatenated. In an embodiment, the final output combining all categorical variables is determined as: $E_{CT,All}$=Concatenate ($E_{CT,m}$, $E_{CT,m-1}$).

In an embodiment, if the system determined, alternatively, that the feature is a continuous variable, the system scales 516 the feature values to fall within a specified range, such as by normalizing the feature to be between [0, 1] or [−1, 1]. In an embodiment, the system generates a continuous vector by concatenating 518 the continuous variables (or scaled versions thereof) for all N continuous variables of the data: $X_{CO,All}$=Scaling+Concatenate $(X1_{CO}, X2_{CO}, \ldots, XN_{CO})$. In an embodiment, system performing the process concatenates 520 the embedding vectors and continuous vectors to form an input vector including both the embedding vectors and continuous vectors and uses the input vector as an input to a deep learning input layer to generate a target variable. The target variable, in an embodiment, is averaged from a predetermined number (e.g., 20) random seeds.

Figure 6:
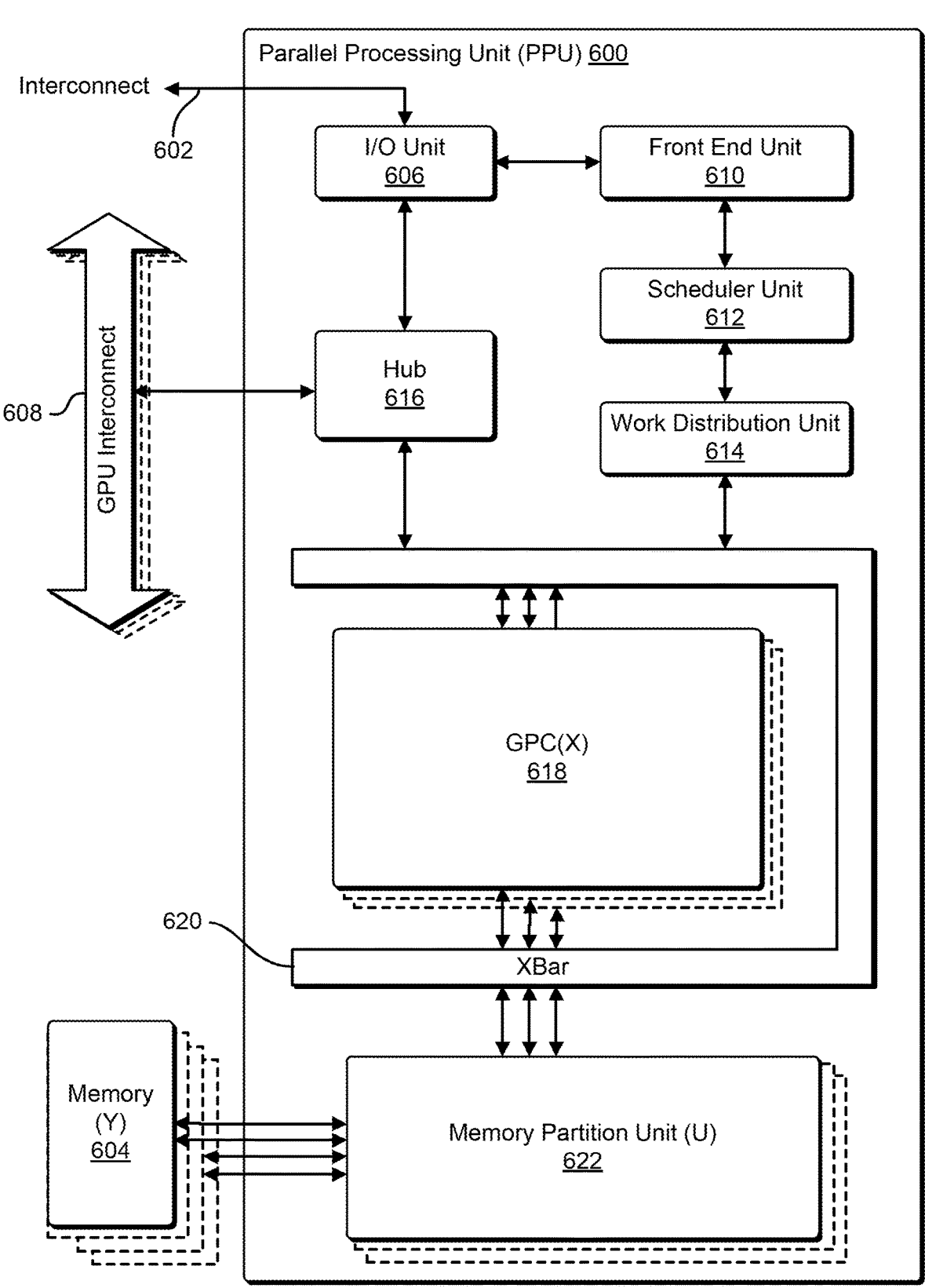
FIG. 6 illustrates an example of parallel processing unit ("PPU"), in accordance with an embodiment.

FIG. 6 illustrates a parallel processing unit ("PPU") 600, in accordance with one embodiment. In an embodiment, the PPU 600 is configured with machine-readable code that, if executed by the PPU, causes the PPU to perform some or all of processes and techniques described throughout this disclosure. In an embodiment, the PPU 600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 600. In an embodiment, the PPU 600 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 600 is utilized to perform computations such as linear algebra operations and machine-learning operations. FIG. 6 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 600 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 600 includes an Input/Output ("I/O") unit 605, a front-end unit 610, a scheduler unit 612, a work distribution unit 614, a hub 616, a crossbar ("Xbar") 620, one or more general processing clusters ("GPCs") 618, and one or more partition units 622. In an embodiment, the PPU 600 is connected to a host processor or other PPUs 600 via one or more high-speed GPU interconnects 608. In an embodiment, the PPU 600 is connected to a host processor or other peripheral devices via an interconnect 602. In an embodiment, the PPU 600 is connected to a local memory comprising one or more memory devices 604. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 608 may refer to a wire-based multi-lane communications link that is used by systems to scale and include one or more PPUs 600 combined with one or more CPUs, supports cache coherence between the PPUs 600 and CPUs, and CPU mastering. In an embodiment, data and/or commands are transmitted by the high-speed GPU interconnect 608 through the hub 616 to/from other units of the PPU 600 such as one or more copy engines, video encoders, video decoders, power management units, and other components which may not be explicitly illustrated in FIG. 6.

In an embodiment, the I/O unit 605 is configured to transmit and receive communications (e.g., commands, data) from a host processor (not illustrated in FIG. 6) over the system bus 602. In an embodiment, the I/O unit 605 communicates with the host processor directly via the system bus 602 or through one or more intermediate devices such as a memory bridge. In an embodiment, the I/O unit 605 may communicate with one or more other processors, such as one or more of the PPUs 600 via the system bus 602. In an embodiment, the I/O unit 605 implements a Peripheral Component Interconnect Express ("PCIe") interface for communications over a PCIe bus. In an embodiment, the I/O unit 605 implements interfaces for communicating with external devices.

In an embodiment, the I/O unit 605 decodes packets received via the system bus 602. In an embodiment, at least some packets represent commands configured to cause the PPU 600 to perform various operations. In an embodiment, the I/O unit 605 transmits the decoded commands to various other units of the PPU 600 as specified by the commands. In an embodiment, commands are transmitted to the front-end unit 610 and/or transmitted to the hub 616 or other units of the PPU 600 such as one or more copy engines, a video encoder, a video decoder, a power management unit, etc. (not explicitly illustrated in FIG. 6). In an embodiment, the I/O unit 605 is configured to route communications between and among the various logical units of the PPU 600.

In an embodiment, a program executed by the host processor encodes a command stream in a buffer that provides workloads to the PPU 600 for processing. In an embodiment, a workload comprises instructions and data to be processed by those instructions. In an embodiment, the buffer is a region in a memory that is accessible (e.g., read/write) by both the host processor and the PPU 600—the host interface unit may be configured to access the buffer in a system memory connected to the system bus 602 via memory requests transmitted over the system bus 602 by the I/O unit 605. In an embodiment, the host processor writes the command stream to the buffer and then transmits a pointer to the start of the command stream to the PPU 600 such that the front-end unit 610 receives pointers to one or more command streams and manages the one or more streams, reading commands from the streams and forwarding commands to the various units of the PPU 600.

In an embodiment, the front-end unit 610 is coupled to a scheduler unit 612 that configures the various GPCs 618 to process tasks defined by the one or more streams. In an embodiment, the scheduler unit 612 is configured to track state information related to the various tasks managed by the scheduler unit 612 where the state information may indicate which GPC 618 a task is assigned to, whether the task is active or inactive, a priority level associated with the task, and so forth. In an embodiment, the scheduler unit 612 manages the execution of a plurality of tasks on the one or more GPCs 618.

In an embodiment, the scheduler unit 612 is coupled to a work distribution unit 614 that is configured to dispatch tasks for execution on the GPCs 618. In an embodiment, the work distribution unit 614 tracks a number of scheduled tasks received from the scheduler unit 612 and the work distribution unit 614 manages a pending task pool and an active task pool for each of the GPCs 618. In an embodiment, the pending task pool comprises a number of slots (e.g., 32 slots) that contain tasks assigned to be processed by a particular GPC 618; the active task pool may comprise a number of slots (e.g., 4 slots) for tasks that are actively being processed by the GPCs 618 such that as a GPC 618 completes the execution of a task, that task is evicted from the active task pool for the GPC 618 and one of the other tasks from the pending task pool is selected and scheduled for execution on the GPC 618. In an embodiment, if an active task is idle on the GPC 618, such as while waiting for a data dependency to be resolved, then the active task is evicted from the GPC 618 and returned to the pending task pool while another task in the pending task pool is selected and scheduled for execution on the GPC 618.

In an embodiment, the work distribution unit 614 communicates with the one or more GPCs 618 via XBar 620. In an embodiment, the XBar 620 is an interconnect network that couples many of the units of the PPU 600 to other units of the PPU 600 and can be configured to couple the work distribution unit 614 to a particular GPC 618. Although not shown explicitly, one or more other units of the PPU 600 may also be connected to the XBar 620 via the hub 616.

The tasks are managed by the scheduler unit 612 and dispatched to a GPC 618 by the work distribution unit 614. The GPC 618 is configured to process the task and generate results. The results may be consumed by other tasks within the GPC 618, routed to a different GPC 618 via the XBar 620, or stored in the memory 604. The results can be written to the memory 604 via the partition units 622, which implement a memory interface for reading and writing data to/from the memory 604. The results can be transmitted to another PPU 604 or CPU via the high-speed GPU interconnect 608. In an embodiment, the PPU 600 includes a number U of partition units 622 that is equal to the number of separate and distinct memory devices 604 coupled to the PPU 600. A partition unit 622 will be described in more detail below in conjunction with FIG. 8.

In an embodiment, a host processor executes a driver kernel that implements an application programming interface ("API") that enables one or more applications executing on the host processor to schedule operations for execution on the PPU 600. In an embodiment, multiple compute applications are simultaneously executed by the PPU 600 and the PPU 600 provides isolation, quality of service ("QoS"), and independent address spaces for the multiple compute applications. In an embodiment, an application generates instructions (e.g., in the form of API calls) that cause the driver kernel to generate one or more tasks for execution by the PPU 600 and the driver kernel outputs tasks to one or more streams being processed by the PPU 600. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 8A.

Figure 7:
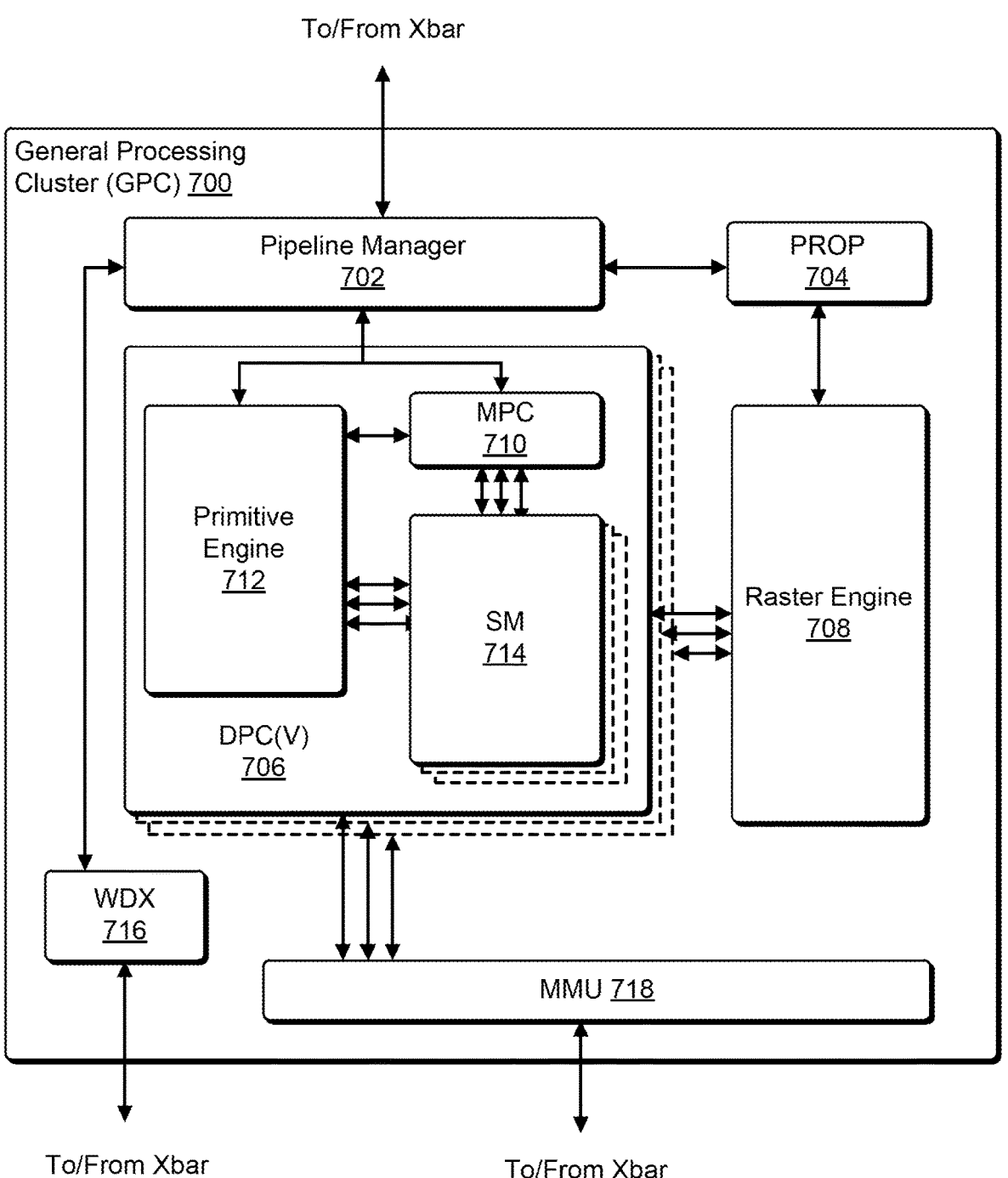
FIG. 7 illustrates an example of a general processing cluster ("GPC"), in accordance with one embodiment.

FIG. 7 illustrates a GPC 700 such as the GPC illustrated of the PPU 600 of FIG. 6, in accordance with one embodiment. In an embodiment, each GPC 700 includes a number of hardware units for processing tasks and each GPC 700 includes a pipeline manager 702, a pre-raster operations unit ("PROP") 704, a raster engine 708, a work distribution crossbar ("WDX") 716, a memory management unit ("MMU") 718, one or more Data Processing Clusters ("DPCs") 706, and any suitable combination of parts. It will be appreciated that the GPC 700 of FIG. 7 may include other hardware units in lieu of or in addition to the units shown in FIG. 7.

In an embodiment, the operation of the GPC 700 is controlled by the pipeline manager 702. The pipeline manager 702 manages the configuration of the one or more DPCs 706 for processing tasks allocated to the GPC 700. In an embodiment, the pipeline manager 702 configures at least one of the one or more DPCs 706 to implement at least a portion of a graphics rendering pipeline. In an embodiment, a DPC 706 is configured to execute a vertex shader program on the programmable streaming multiprocessor ("SM") 714. The pipeline manager 702 is configured to route packets received from a work distribution to the appropriate logical units within the GPC 700, in an embodiment, and some packets may be routed to fixed function hardware units in the PROP 704 and/or raster engine 708 while other packets may be routed to the DPCs 706 for processing by the primitive engine 712 or the SM 714. In an embodiment, the pipeline manager 702 configures at least one of the one or more DPCs 706 to implement a neural network model and/or a computing pipeline.

The PROP unit 704 is configured, in an embodiment, to route data generated by the raster engine 708 and the DPCs 706 to a Raster Operations ("ROP") unit in the memory partition unit, described in more detail above. In an embodiment, the PROP unit 704 is configured to perform optimizations for color blending, organize pixel data, perform address translations, and more. The raster engine 708 includes a number of fixed function hardware units configured to perform various raster operations, in an embodiment, and the raster engine 708 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 708 comprises fragments to be processed by any suitable entity such as by a fragment shader implemented within a DPC 706.

In an embodiment, each DPC 706 included in the GPC 700 comprises an M-Pipe Controller ("MPC") 710; a primitive engine 712; one or more SMs 714; and any suitable combination thereof. In an embodiment, the MPC 710 controls the operation of the DPC 706, routing packets received from the pipeline manager 702 to the appropriate units in the DPC 706. In an embodiment, packets associated with a vertex are routed to the primitive engine 712, which is configured to fetch vertex attributes associated with the vertex from memory; in contrast, packets associated with a shader program may be transmitted to the SM 714.

In an embodiment, the SM 714 comprises a programmable streaming processor that is configured to process tasks represented by a number of threads. In an embodiment, the SM 714 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 714 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 714 is described in more detail below.

In an embodiment, the MMU 718 provides an interface between the GPC 700 and the memory partition unit and the MMU 718 provides translation of virtual addresses into physical addresses, memory protection, and arbitration of memory requests. In an embodiment, the MMU 718 provides one or more translation lookaside buffers ("TLBs") for performing translation of virtual addresses into physical addresses in memory.

Figure 8:
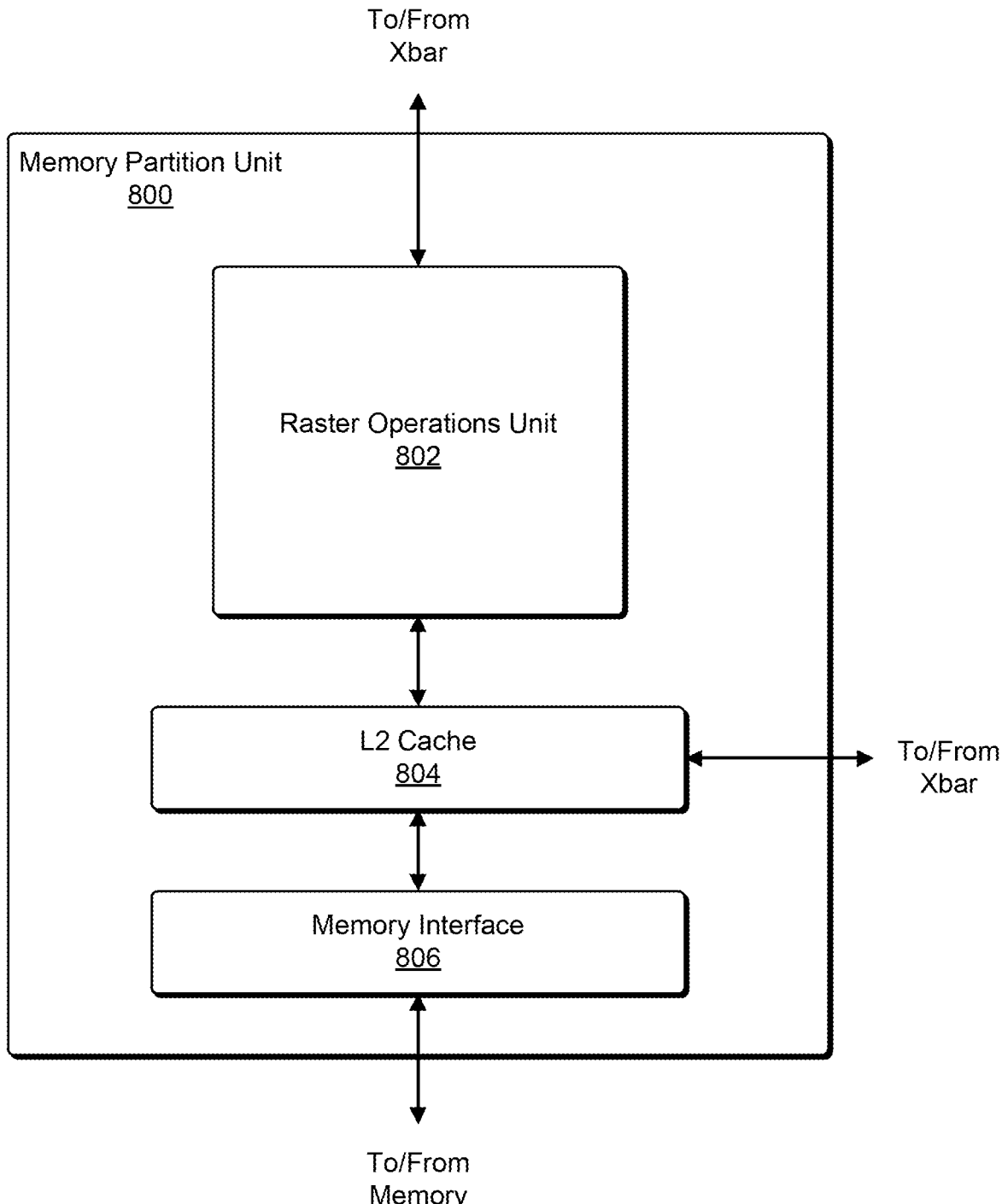
FIG. 8 illustrates an example of a memory partition unit, in accordance with one embodiment.

FIG. 8 illustrates a memory partition unit of a PPU, in accordance with one embodiment. In an embodiment, the memory partition unit 800 includes a Raster Operations ("ROP") unit 802; a level two ("L2") cache 804; a memory interface 806; and any suitable combination thereof. The memory interface 806 is coupled to the memory. Memory interface 806 may implement 32, 64, 128, 1024-bit data buses, or the like, for high-speed data transfer. In an embodiment, the PPU incorporates U memory interfaces 806, one memory interface 806 per pair of partition units 800, where each pair of partition units 800 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 806 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 800 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 608 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 800 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 6 or other system memory is fetched by the memory partition unit 800 and stored in the L2 cache 804, which is located on-chip and is shared between the various GPCs, in accordance with one embodiment. Each memory partition unit 800, in an embodiment, includes at least a portion of the L2 cache 760 associated with a corresponding memory device. In an embodiment, lower level caches are implemented in various units within the GPCs. In an embodiment, each of the SMs 840 may implement a level one ("L1") cache wherein the L1 cache is private memory that is dedicated to a particular SM 840 and data from the L2 cache 804 is fetched and stored in each of the L1 caches for processing in the functional units of the SMs 840. In an embodiment, the L2 cache 804 is coupled to the memory interface 806 and the XBar 620.

The ROP unit 802 performs graphics raster operations related to pixel color, such as color compression, pixel blending, and more, in an embodiment. The ROP unit $$50, in an embodiment, implements depth testing in conjunction with the raster engine 825, receiving a depth for a sample location associated with a pixel fragment from the culling engine of the raster engine 825. In an embodiment, the depth is tested against a corresponding depth in a depth buffer for a sample location associated with the fragment. In an embodiment, if the fragment passes the depth test for the sample location, then the ROP unit 802 updates the depth buffer and transmits a result of the depth test to the raster engine 825. It will be appreciated that the number of partition units 800 may be different than the number of GPCs and, therefore, each ROP unit 802 can, in an embodiment, be coupled to each of the GPCs. In an embodiment, the ROP unit 802 tracks packets received from the different GPCs and determines which that a result generated by the ROP unit 802 is routed to through the Xbar.

Figure 9:
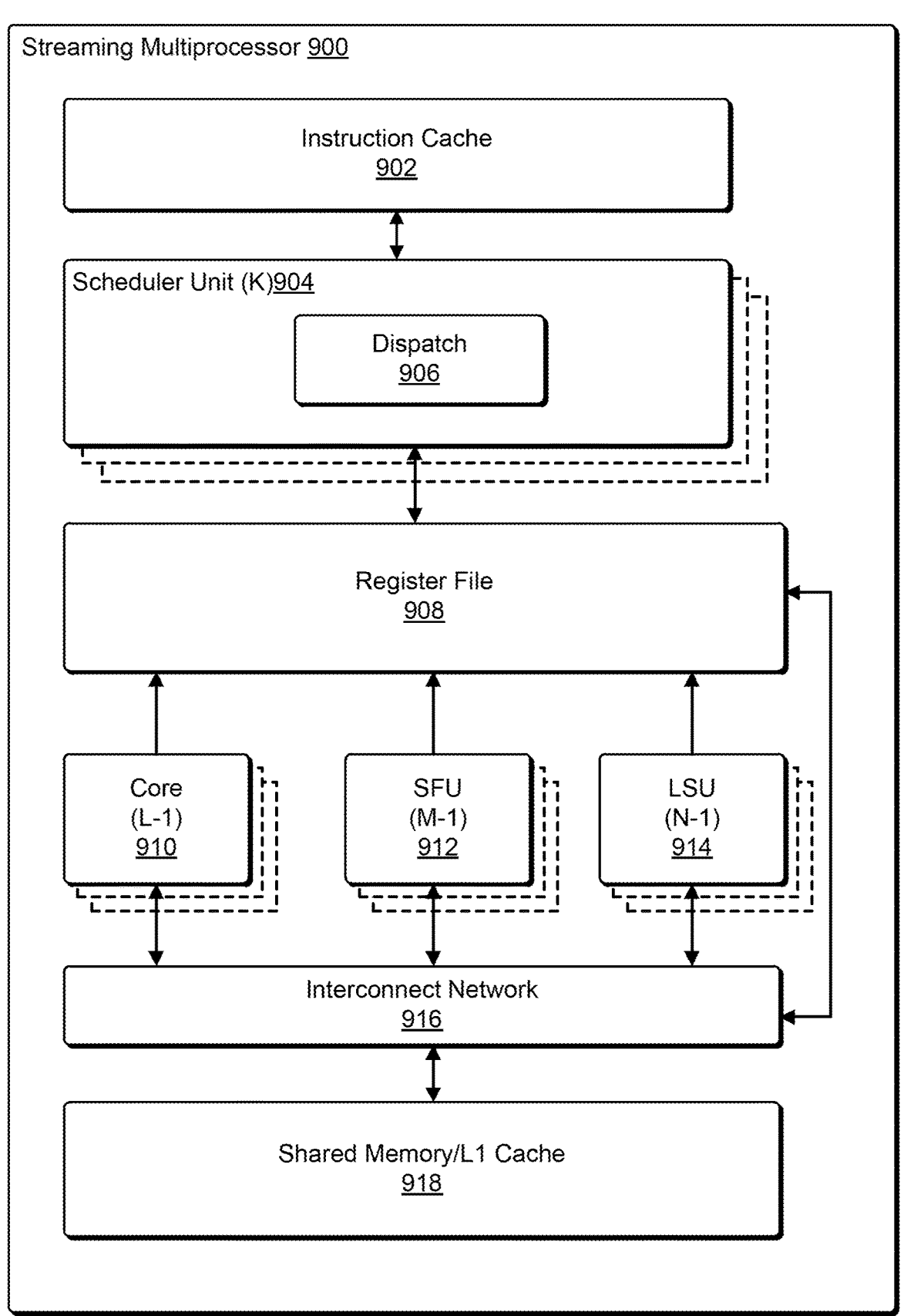
FIG. 9 illustrates an example of a streaming multi-processor, in accordance with one embodiment.

FIG. 9 illustrates a streaming multi-processor such as the streaming multi-processor of FIG. 7, in accordance with one embodiment. In an embodiment, the SM 900 includes: an instruction cache 902; one or more scheduler units 904; a register file 908; one or more processing cores 910; one or more special function units ("SFUs") 912; one or more load/store units ("LSUs") 914; an interconnect network 916; a shared memory/L1 cache 918; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 900. In an embodiment, the scheduler unit 904 receives the tasks from the work distribution unit and manages instruction scheduling for one or more thread blocks assigned to the SM 900. In an embodiment, the scheduler unit 904 schedules thread blocks for execution as warps of parallel threads, wherein each thread block is allocated at least one warp. In an embodiment, each warp executes threads. In an embodiment, the scheduler unit 904 manages a plurality of different thread blocks, allocating the warps to the different thread blocks and then dispatching instructions from the plurality of different cooperative groups to the various functional units (e.g., cores 910, SFUs 912, and LSUs 914) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 906 is configured to transmit instructions to one or more of the functional units and the scheduler unit 904 includes two dispatch units 906 that enable two different instructions from the same warp to be dispatched during each clock cycle. In an embodiment, each scheduler unit 904 includes a single dispatch unit 906 or additional dispatch units 906.

Each SM 900, in an embodiment, includes a register file 908 that provides a set of registers for the functional units of the SM 900. In an embodiment, the register file 908 is divided between each of the functional units such that each functional unit is allocated a dedicated portion of the register file 908. In an embodiment, the register file 908 is divided between the different warps being executed by the SM 900 and the register file 908 provides temporary storage for operands connected to the data paths of the functional units. In an embodiment, each SM 900 comprises a plurality of L processing cores 910. In an embodiment, the SM 900 includes a large number (e.g., 128 or more) of distinct processing cores 910. Each core 910, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754–2008 standard for floating point arithmetic. In an embodiment, the cores 910 include 64 single-precision (32-bit) floating point cores, 64 integer cores, 32 double-precision (64-bit) floating point cores, and 8 tensor cores. In an embodiment, an arithmetic logic circuits include one or more arithmetic logic units.

Tensor cores are configured to perform matrix operations in accordance with an embodiment. In an embodiment, one or more tensor cores are included in the cores 910. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 900 comprises M SFUs 912 that perform special functions (e.g., attribute evaluation, reciprocal square root, and the like). In an embodiment, the SFUs 912 include a tree traversal unit configured to traverse a hierarchical tree data structure. In an embodiment, the SFUs 912 include texture unit configured to perform texture map filtering operations. In an embodiment, the texture units are configured to load texture maps (e.g., a 2D array of texels) from the memory and sample the texture maps to produce sampled texture values for use in shader programs executed by the SM 900. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 900 includes two texture units.

Each SM 900 comprises N LSUs 854 that implement load and store operations between the shared memory/L1 cache 806 and the register file 908, in an embodiment. Each SM 900 includes an interconnect network 916 that connects each of the functional units to the register file 908 and the LSU 914 to the register file 908, shared memory/L1 cache 918 in an embodiment. In an embodiment, the interconnect network 916 is a crossbar that can be configured to connect any of the functional units to any of the registers in the register file 908 and connect the LSUs 914 to the register file and memory locations in shared memory/L1 cache 918.

The shared memory/L1 cache 918 is an array of on-chip memory that allows for data storage and communication between the SM 900 and the primitive engine and between threads in the SM 900 in an embodiment. In an embodiment, the shared memory/L1 cache 918 comprises 128 KB of storage capacity and is in the path from the SM 900 to the partition unit. The shared memory/L1 cache 918, in an embodiment, is used to cache reads and writes. One or more of the shared memory/L1 cache 918, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 918 enables the shared memory/L1 cache 918 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 900 to execute the program and perform calculations, shared memory/L1 cache 918 to communicate between threads, and the LSU 914 to read and write global memory through the shared memory/L1 cache 918 and the memory partition unit, in accordance with one embodiment. In an embodiment, when configured for general purpose parallel computation, the SM 900 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 10:
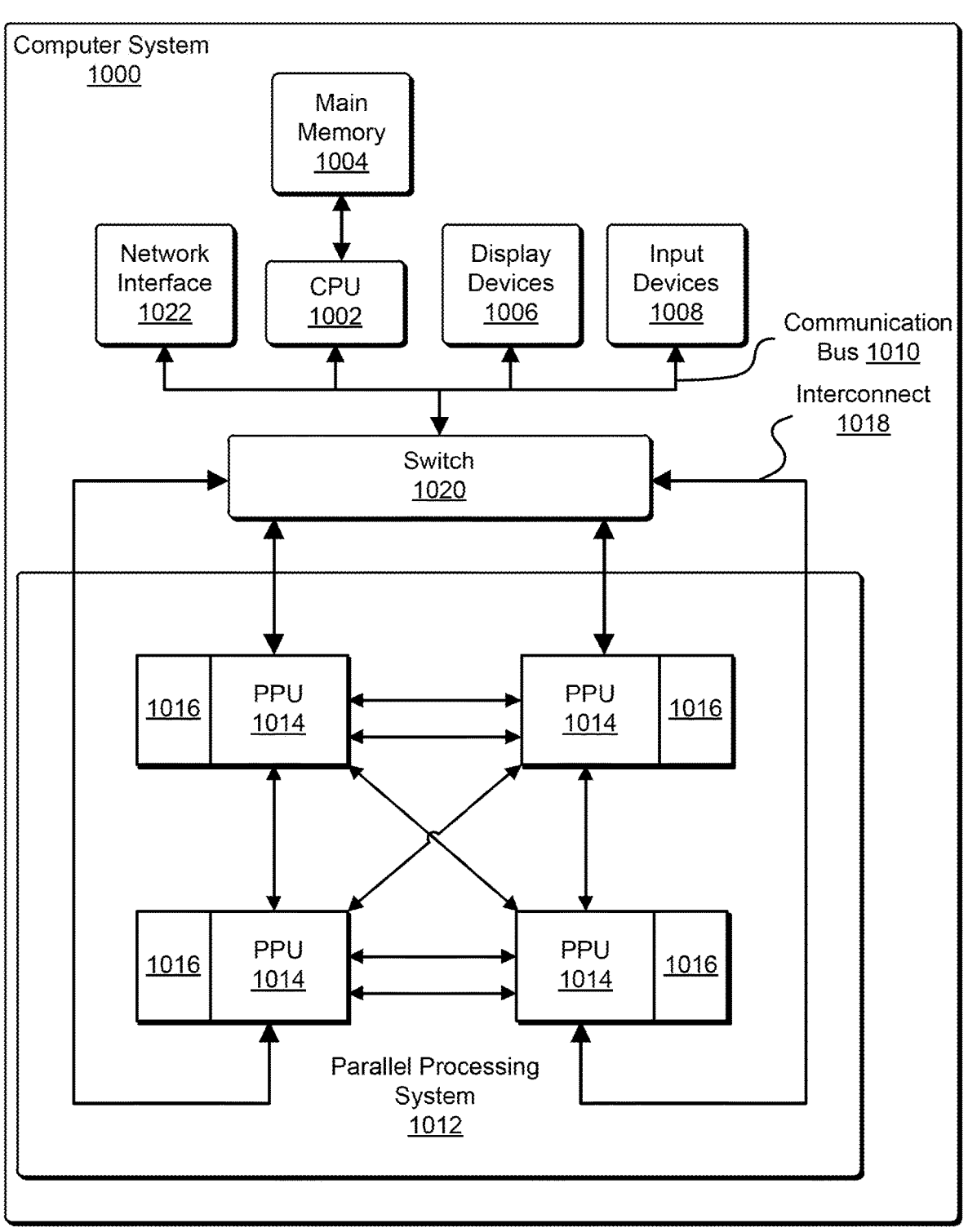
FIG. 10 illustrates a computer system in which the various examples can be implemented, in accordance with one embodiment.

FIG. 10 illustrates a computer system 1000 in which the various architecture and/or functionality can be implemented, in accordance with one embodiment. The computer system 1000, in an embodiment, is configured to implement various processes and methods described throughout this disclosure.

In an embodiment, the computer system 1000 comprises at least one central processing unit 1002 that is connected to a communication bus 1010 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1000 includes a main memory 1004 and control logic (e.g., implemented as hardware, software, or a combination thereof) and data are stored in the main memory 1004 which may take the form of random access memory ("RAM"). In an embodiment, a network interface subsystem 1022 provides an interface to other computing devices and networks for receiving data from and transmitting data to other systems from the computer system 1000.

The computer system 1000, in an embodiment, includes input devices 1008, the parallel processing system 1012, and display devices 1006 which can be implemented using a conventional CRT (cathode ray tube), LCD (liquid crystal display), LED (light emitting diode), plasma display, or other suitable display technologies. In an embodiment, user input is received from input devices 1008 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1004 and/or secondary storage. Computer programs, if executed by one or more processors, enable the system 1000 to perform various functions in accordance with one embodiment. The memory 1004, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1002; parallel processing system 1012; an integrated circuit capable of at least a portion of the capabilities of both the central processor 1002; the parallel processing system 1012; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1000 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1012 includes a plurality of PPUs 1014 and associated memories 1016. In an embodiment, the PPUs are connected to a host processor or other peripheral devices via an interconnect 1018 and a switch 1020 or multiplexer. In an embodiment, the parallel processing system 1012 distributes computational tasks across the PPUs 1014 which can be parallelizable for example, as part of the distribution of computational tasks across multiple GPU thread blocks. In an embodiment, memory is shared and accessible (e.g., for read and/or write access) across some or all of the PPUs 1014, although such shared memory may incur performance penalties relative to the use of local memory and registers resident to a PPU. In an embodiment, the operation of the PPUs 1014 is synchronized through the use of a command such as _syncthreads( ) which requires all threads in a block (e.g., executed across multiple PPUs 1014) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system"

and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor, comprising:
one or more circuits to train one or more neural networks, wherein to train the one or more neural networks the one or more circuits are to:
input training data to the one or more neural networks to cause first activation values to be output from one or more intermediate neural network portions within the one or more neural networks as intermediate predictions based on one or more features of the training data input to the one or more neural networks;
select, based, at least in part, on prediction error magnitudes for the first activation values, one or more of the first activation values to be replaced;
replace the selected one or more first activation values with one or more second activation values, having a greater accuracy than the selected one or more first activation values; and
adjust parameters for the one or more neural networks based, at least in part, on a final prediction based, at least in part, on the one or more second activation values, wherein one or more prediction errors of the intermediate predictions are prevented from propagating to the final prediction by the replacement of the one or more first activation values with the one or more second activation values.

2. The processor of claim 1, wherein the one or more neural networks are to be trained to predict market demand for one or more products or services.

3. The processor of claim 1, wherein the one or more circuits are to at least partially cause the one or more first activation values to be replaced with ground truth data at a probability that is positively correlated to a prediction error determined based on the one or more first activation values and the ground truth data.

4. The processor of claim 1, wherein an accuracy of the one or more first activation values is based on data of past market demand for one or more products or services.

5. The processor of claim 1, wherein the processor comprises a graphical processing unit (GPU).

6. The processor of claim 1, wherein the one or more neural networks generate a prediction model that generates, from an input time series, a predicted output time series.

7. The processor of claim 6, wherein the input time series is a variable-length input and the predicted output time series is a variable-length output.

8. The processor of claim 1, wherein the one or more neural networks comprise one or more recurrent neural networks.

9. The processor of claim 1, wherein to replace the one or more first activation values, the one or more circuits are to probabilistically replace the one or more first activation values with ground truth data.

10. The processor of claim 9, wherein to probabilistically replace the one or more first activation values with the ground truth data, the one or more circuits are to cause the replace according to a probability that is based at least in part on a magnitude of a prediction error associated with the one or more first activation values.

11. The processor of claim 9, wherein to probabilistically replace the one or more first activation values with the ground truth data, the one or more circuits are to cause the replace according to a probability that is based at least in part on how many epochs of training have elapsed.

12. A method, comprising
training one or more neural networks, wherein the training includes;
inputting training data to the one or more neural networks to obtain one or more first activation values as one or more intermediate predictions generated by one or more layers of the one or more neural networks based on one or more features of the training data;
selecting, based, at least in part, on prediction error magnitudes for the first activation values, one or more of the first activation values to be replaced;
replacing the selected one or more first activation values with one or more second activation values, having a greater accuracy than the one or more first activation values; and
adjusting parameters for the one or more neural networks based, at least in part, on a final prediction based, at least in part, on the one or more second activation values, wherein one or more prediction errors of the intermediate predictions are prevented from propagating to the final prediction by the replacement of the one or more first activation values with the one or more second activation values.

13. The method of claim 12, wherein the one or more neural networks are to be trained to predict market demand for one or more products or services.

14. The method of claim 12, wherein:
the one or more neural networks comprises an encoder neural network and a decoder neural network; and
training the one or more neural network comprises replacing the one or more first activation values of the decoder.

15. The method of claim 12, wherein training the one or more neural network comprises:
obtaining training data for a first neural network of the one or more neural networks to generate an encoded state; and
providing the encoded state to a second neural network of the one or more neural networks to generate the one or more first activation values.

16. The method of claim 15, wherein the encoded state has a fixed length.

17. The method of claim 12, wherein the one or more neural networks are trained with data of a first time-series to generate predicated data for a second time-series.

18. The method of claim 17, wherein the first time-series and the second time-series are contiguous.

19. A system, comprising:
one or more processors to train one or more neural networks, wherein to train the one or more neural networks the one or more processors are to:
input training data to the one or more neural networks to cause first activation values to be output from one or more intermediate neural network portions within the one or more neural networks as intermediate predictions based on one or more features of the training data input to the one or more neural networks;
select, based, at least in part, on prediction error magnitudes for the first activation values, one or more of the first activation values to be replaced;
replace the selected one or more first activation values with one or more second activation values, having a greater accuracy than the selected one or more first activation values; and
adjust parameters for the one or more neural networks based, at least in part, on a final prediction based, at least in part, on the one or more second activation values, wherein one or more prediction errors of the intermediate predictions are prevented from propagating to the final prediction by the replacement of the one or more first activation values with the one or more second activation values.

20. The system of claim 19, wherein the one or more neural networks are to be trained to predict market demand for one or more products or services.

21. The system of claim 20, wherein the one or more first activation values are to be replaced with ground truth data based, at least in part, on historical price information for the one or more products or services.

22. The system of claim 20, wherein the one or more neural networks are to be trained to predict market demand of the one or more products or services in a particular set of countries.

23. The system of claim 19, wherein the one or more processors are to be further configured to determine a probability to replace the one or more first activation values with ground truth data by calculating a magnitude of error based on the ground truth data and the one or more first activation values.

24. The system of claim 23, wherein the probability to replace the one or more first activation values is further based on how many epochs have elapsed during training of the one or more neural networks.

25. The system of claim 19, wherein the one or more neural networks comprises one or more long short-term memory (LSTM) units.

26. The system of claim 19, wherein the one or more processors comprise a computer processing unit (CPU).

27. A system, comprising memory to store instructions that, as a result of execution by one or more processors, causes the system to:

configure one or more a circuits with one or more parameters corresponding to one or more neural networks trained by:

inputting training data to the one or more neural networks to obtain one or more first activation values as one or more intermediate predictions generated by one or more layers of the one or more neural networks based on one or more features of the training data;

selecting, based, at least in part, on prediction error magnitudes for the first activation values, one or more of the first activation values to be replaced;

replacing the selected one or more first activation values with one or more second activation values, having a greater accuracy than the one or more first activation values; and adjusting parameters for the one or more neural networks based, at least in part, on a final prediction based, at least in part, on the one or more second activation values, wherein one or more prediction errors of the intermediate predictions are prevented from propagating to the final prediction by the replacement of the one or more first activation values with the one or more second activation values.

28. The processor of claim 27, wherein the one or more neural networks are to be trained to predict market demand for one or more products or services.

29. The system of claim 27, wherein the one or more neural networks comprises one or more gated recurrent units (GRUs).

30. The system of claim 27, wherein the system comprises an application-specific integrated circuit (ASIC).

31. The system of claim 27, wherein the instructions to replace the one or more first activation values using the one or more second activation values based, at least in part, on ground truth data include instructions that, as a result of execution, cause the system to use the ground truth data to generate a linear interpolation value based at least in part the ground truth data and the one or more first activation values.

32. The system of claim 31, wherein the linear interpolation value is generated further based at least in part on an output sequence length being generated by the one or more layers.

33. The system of claim 31, wherein the linear interpolation value is a different value from the ground truth data.

* * * * *